United States Patent [19]

Watanabe

[11] Patent Number: 5,038,660
[45] Date of Patent: Aug. 13, 1991

[54] RECORDING MEDIUM PLAYING APPARATUS WITH PROGRAM DISCONTINUITY RESPONSE

[75] Inventor: Osamu Watanabe, Tokorozawa, Japan

[73] Assignee: Pioneer Electronic Corporation, Tokyo, Japan

[21] Appl. No.: 377,970

[22] Filed: Jul. 11, 1989

[51] Int. Cl.$^5$ .............................................. G10H 3/00
[52] U.S. Cl. ........................................ 84/601; 84/642; 84/DIG. 29
[58] Field of Search .................................. 84/601–646, 84/DIG. 12, DIG. 22, DIG. 29

[56] References Cited

U.S. PATENT DOCUMENTS 4,419,918 12/1983 Dyck et al. .................. 84/DIG. 12

Primary Examiner—Stanley J. Witkowski
Attorney, Agent, or Firm—Foley & Lardner

[57] ABSTRACT

A recording medium playing apparatus comprises a reading device for reading, from an information recording medium on which a sub-program signal carrying a musical instrument play control signal is written in order together with a main program signal, the main program signal and the sub-program signal simultaneously according to an order of writing, a musical instrument play control signal decoding device for decoding a musical instrument play control signal from the sub-program signal and supplying the musical instrument play control signal to electronic musical instruments, and a control device for controlling the operation of the reading device in response to an operational command. The control device is adapted to command the musical instrument play control signal decoding device to transmit a sound generation stop command signal when the content of the operational command is to cause the reading device to perform a reading operation in which the order of reading is different from the order of writing.

8 Claims, 3 Drawing Sheets

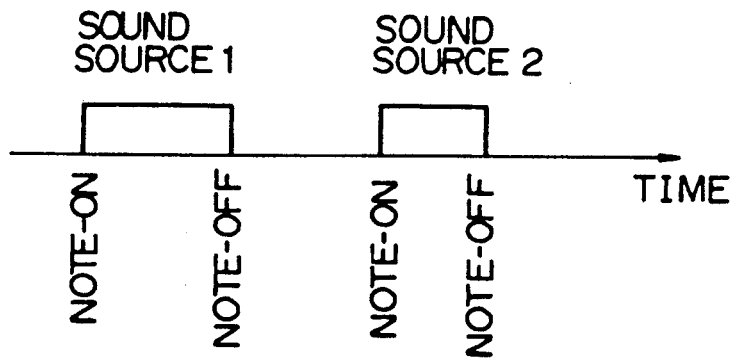
Fig. 3A
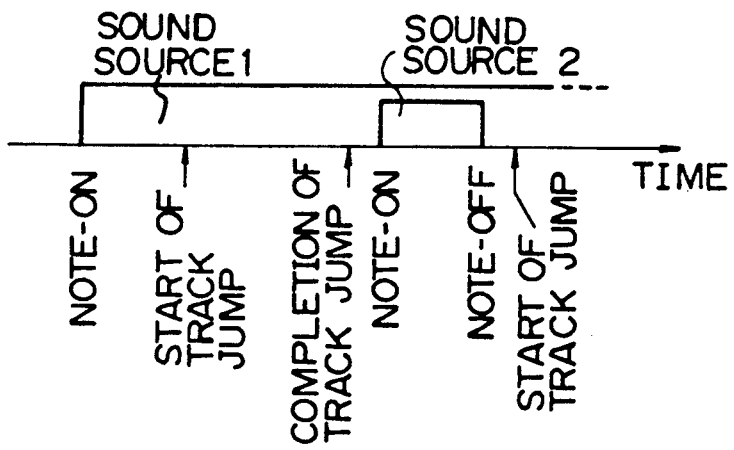
Fig. 3B
Fig. 5
| SYMBOL | R S T U V W |
|---|---|
| 0 | MODE / ITEM |
| 1 | INSTRUCTION |
| 2 | PARITY Q0 |
| 3 | PARITY Q1 |
| 4 | DATA FIELD |
| 5 | |
| ⋮ | |
| 19 | |
| 20 | PARITY P0 |
| 21 | PARITY P1 |
| 22 | PARITY P2 |
| 23 | PARITY P3 |

RECORDING MEDIUM PLAYING APPARATUS WITH PROGRAM DISCONTINUITY RESPONSE

BACKGROUND OF THE INVENTION

1. Field of the Invention

The present invention relates to a disc playing apparatus for playing an information recording disc (simply referred to as disc hereinafter) carrying a signal for controlling the operation of electronic musical instruments.

2. Description of Background Information

A standard called MIDI (Musical Instrument Digital Interface) has been developed so as to enable a music performance using a plurality of sound sources by combining a plurality of electronic musical instruments such as a music synthesizer or an electronic piano.

A term "MIDI apparatus" is used for designating an electronic musical instrument which includes a hardware according to MIDI standard and has a function to transmit and receive a data format signal (referred to as MIDI signal hereinafter) as a musical instrument control signal of a defined form carrying musical information.

As for the recording format used for recording information on a disc, a subcode carrying play control information or the like is recorded on a disc such as a CD (compact disc), CD-V (cd-video), LD (laser disc) with CD format digital sound. The subcode is constituted by channels P, Q, R, S, T, U, V, and W in which channels P and Q are used as the control signal of the disc player.

On the other hand, R through W channels are vacant channels designated as user's bit, and various types of utilization of these channels such as the recording of graphic images, sounds, picture images, are being considered. A standard for the recording format of graphic image has been already proposed. The MIDI signal can be recorded in this user's bit.

In this case, in addition to the viewing and listening of recorded programs by the supply of audio and video signals reproduced by the disc player to an audio visual (AV) system, it is possible to supply information of programs to be played to one or more MIDI apparatuses provided besides the audio visual system. Therefore, various possibility of the utilization of this arrangement, such as the construction of an AV system including electronic musical instruments and capable of a program reproduction with full of presence, or the application to the production of educational softwares, are being considered.

MIDI apparatuses are configured to perform a music according to a musical instrument playing program which is constituted by the MIDI signal successively supplied from the disc player. Therefore, if the disc player receives a command of an operation requiring a track jump while the player is transmitting the musical instrument playing program, it becomes no more possible to read the program in the order of writing, which results in the generation of a discontinuity in the musical instrument playing program. Consequently, there may arise various inconveniences such as the impossibility to stop the generation of sound from the sound source of the MIDI apparatuses.

OBJECT AND SUMMARY OF THE INVENTION

An object of the present invention is therefore to provide a disc player which can prevent the generation of inconveniences by a dropping of a part of the musical instrument playing program.

In order to attain the object mentioned above, the disc player according to the present invention includes a reading means for reading a main and sub- program signals simultaneously in the order of writing, from an information recording medium on which the sub-program signal carrying a musical instrument play control signal is written together with the main program signal, a musical instrument play control signal decoding means for decoding the musical instrument play control signal from the sub-program signal and supplying it to musical instruments, a control means for controlling the operation of the reading means, wherein the control means is configured to command the musical instrument playing apparatus to transmit a sound generation stop command signal to the musical instrument play control signal decoding means when the content of the operational command is to cause the reading means to perform a reading operation in an order different from the order of writing.

BRIEF DESCRIPTION OF THE DRAWINGS

FIGS. 3A and 3B are diagrams showing the timing of generation of "note-on" message and "note-off" message;

FIG. 5 is a diagram showing an example of the structure of the subcode data.

DETAILED DESCRIPTION OF A PREFERRED EMBODIMENT

The embodiment of the present invention will be explained in detail with reference to the accompanying drawings.

The MIDI signal is a serial data having a transfer rate of 31.25 Kbaud, and one byte data is constituted by 10 bits including 8-bit data and start and stop bits respectively having one bit.

In order to designate the sort of the transmitted data and the MIDI channel, at least one status byte and one or two data bytes leaded by the status byte are combined, forming a message as the music information. Thus, one message is constituted by 1 through 3 bytes, required for its transfer. The musical instrument playing program is formed by a series of these messages.

Figure 2:
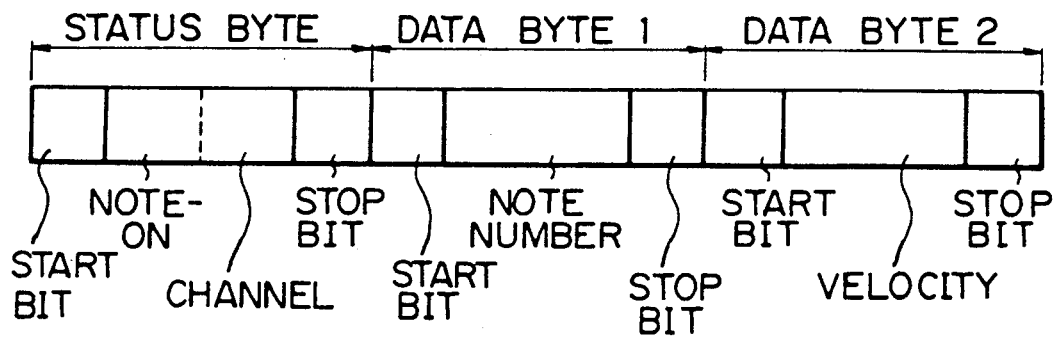
FIG. 2 is a diagram showing an example of the structure of a MIDI message.

As an example of such a message, the structure of the note-on message is shown in FIG. 2.

The note-on message in the status byte is a command corresponding to an operation of pressing a key of the keyboard, and used in a pair along with a note-off message which corresponds to an operation of releasing the key of the keyboard. These messages are shown more in detail in FIG. 3A. The "note-number" in the data byte 1 is used to designate one of 128 stages which are allotted to the keys of the keyboard with its center positioned on the "central do" of the musical scale provided by the sound source. The "velocity" in data byte 2 is a number corresponding to the velocity of operation of the keyboard, and indicates the strength of the sound to be generated.

Upon receipt of the note-on message, the MIDI apparatus generates a note of the designated musical scale at the designated strength, and stops the generation of the note when it receives the note-off message.

As shown in FIG. 3B, after transmitting the note on message to the sound source 1, there may arise any of conditions such as the track jump in the manual search operation or the track search operation, pause, or stop, before transmitting the note-off message. In such a case, the musical instrument playing program constituted by the MIDI signal which is to proceed successively with the lapse of time will be partially dropped, or even the progress of the program will be stopped. As a result, as illustrated in FIG. 3B, the inconvenience arises that the sound is continuously generated by the sound source 1 because of the omission of the note-off message.

Figure 1:
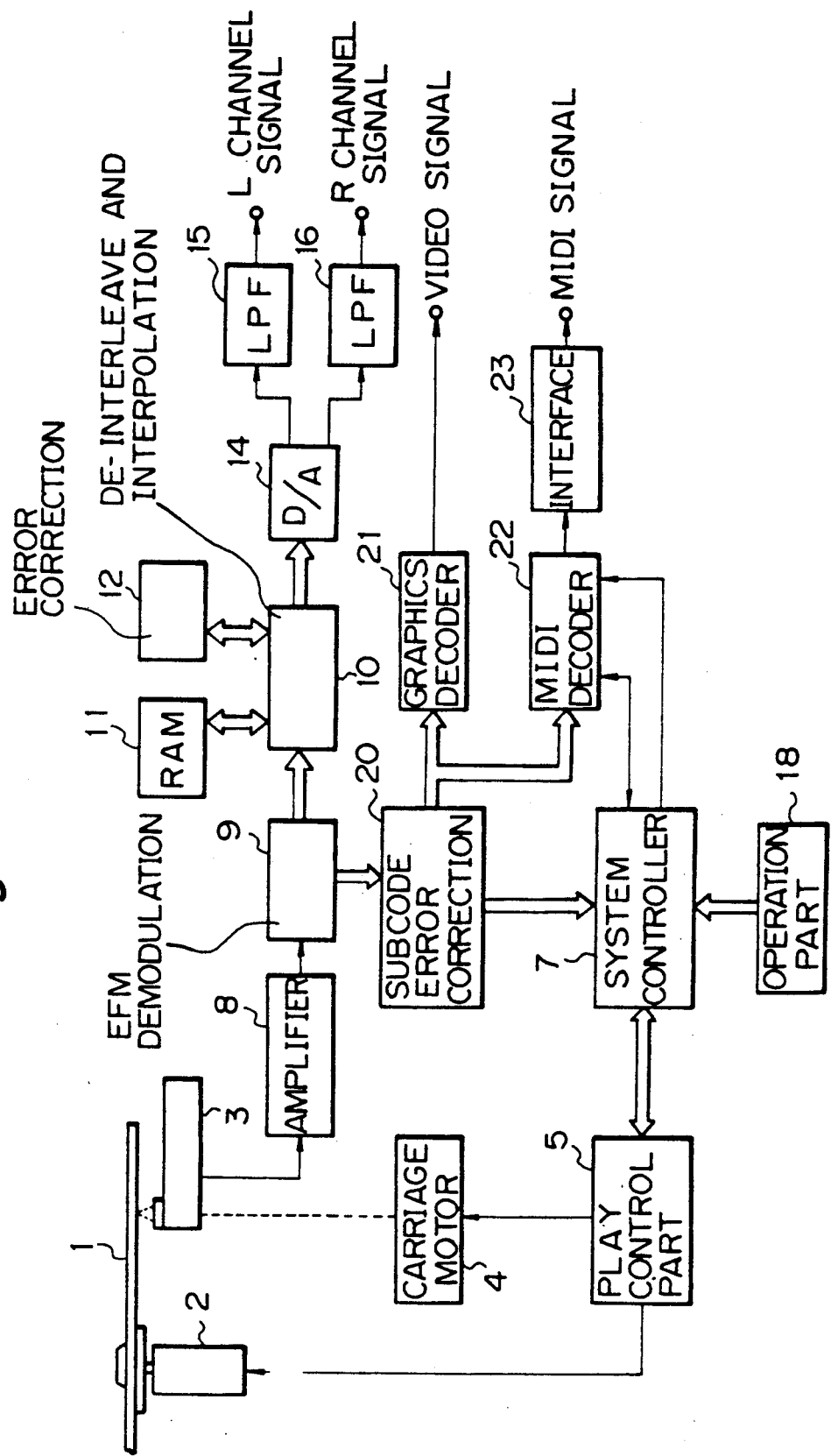
FIG. 1 is a block diagram showing an embodiment of the present invention.

In view of the above point, the embodiment of the present invention shown in FIG. 1 is configured to transmit the note-off message to the MIDI apparatus when the player performs certain operations, so as to reduce the possibility of the occurrence of the inconvenience mentioned above.

In FIG. 1, a disc 1 on which a plurality of music selections are recorded is rotated by a spindle motor 2. Along with the rotation of the disc 1, a signal recorded on the disc is read by a pickup 3. The pickup 3 is carried on a carriage (not shown) which is driven by a carriage motor 4 and movable in a radial direction of the disc 1. With this arrangement, the position of an information reading point (information reading light spot) of the pickup 3 is arbitrarily determined in the radial direction. Furthermore, the player is provided with various servo systems such as the spindle servo system, focus servo system, tracking servo system, and carriage servo system. Since these servo systems themselves are well known, the explanation thereof is not given in the specification.

The spindle motor 2 and the carriage motor 4 are respectively driven by the spindle servo system and the carriage servo system, or directly driven by a playing part control circuit 5. In response to commands from the system controller 7, the playing part control circuit 5 performs various operations such as the drive of the spindle motor 2 and the carriage motor 4, and the on-off control of the servo systems mentioned above, and the jump control.

The RF (radio frequency) signal output from the pickup 3 is amplified by an RF amplifier 8 and supplied to an EFM demodulation circuit 9. The EFM demodulation circuit 9 is configured to perform an EFM modulation of a pulse signal obtained by slicing the RF signal, to produce PCM data, i.e., digital audio data including audio information of the left and right channels multiplexed by the time division multiplex system and the subcode. The digital data including audio information, output from this EFM demodulation circuit 9 is supplied to a de-interleave and interpolation circuit 10. The interleave and interpolation circuit 10 is configured to perform the following operations. In cooperation with RAM 11, the de-interleave and interpolation circuit 10 puts the digital data in its original order, whose order has been changed by the interleave operation at the time of recording. The de-interleave and interpolation circuit 10 then transmits the digital data to an error correction circuit 12, and performs the interpolation of erroneous data in the output data of the error correction circuit 12, by using the average value interpolation method for example, when a signal indicating the impossibility of the correction is issued from the error correction circuit 12.

The output data of the de-interleave and error correction circuit 10 is supplied to a D/A (digital to analog) converting circuit 14. The D/A converting circuit 14 includes a de-multiplexer for separating the audio information of the left and right channels which has been multiplexed by the time division multiplex system into information of each channel, so that audio signals of the left and right channels are reproduced. The audio signals of the left and right channels are supplied to LPFs (low-pass-filters) 15 and 16 where unnecessary components are removed, and supplied to audio output terminals subsequently.

The subcode output from the EFM demodulation circuit 9, on the other hand, is supplied to a subcode error correction circuit 20 where the error correction of the subcode is performed. The P and Q channels of the subcode are supplied to the system controller 7. The P channel of the subcode is provided for distinguishing intervals between two music selections from areas in a music selection. A value 0 is set to the P channel of the subcode for the area in a music selection and a value 1 is set for the interval between two music selections. The Q channel is used as a control code, and the address time code recorded in the Q channel is utilized for the random access operation, for example.

An example of the construction of a data format formed by the R, S, T, U, V, W channels of the subcode is illustrated in FIG. 5. In FIG. 5, the symbol 0 represents the sort of data. For instance, if Mode is 1 and Item is 1, it indicates that the subcode data is a TV-graphics data. If Mode is 111 and Item is 111, the subcode data is a MIDI data. On the the hand, the symbol 1 represents an Instruction mode. For instance, a command for the flash, scroll, or copy operation in the TV graphics is recorded in the symbol 1. The data field in the symbols 4 through 19 carries graphics data and MIDI data. Parity codes for the error correction operation are added to the symbols 20 through 23. The subcode error correction circuit 20 performs the error correction by referring this parity codes. The subcode to which the error correction is performed is supplied to the graphics decoder 21 and the MIDI decoder 22.

If the Mode and Item of the subcode indicate that the subcode data is a TV graphics data, the graphics decoder 21 takes this data and demodulates it into a video signal. The video signal is supplied to a display unit (not shown) through a video output terminal.

If the Mode and Item of the subcode indicate that the subcode data is a MIDI data, the MIDI decoder 22 takes the subcode and decodes it into a serial MIDI signal. The decoded MIDI signal is supplied to an interface 23 comprised of a transmitter and a line driver. The MIDI signal is then supplied to an IN terminals of MIDI apparatuses (not shown) through a MIDI OUTPUT terminal. The MIDI decoder 22 supplies a transmission signal to the system controller 7 while it is decoding the MIDI signal or outputting the decoded MIDI signal. On the other hand, in response to the command from the system controller 7, the MIDI decoder 22 transmits an "all-note-off" message.

The system controller 7 is constituted by a microcomputer including a processor, ROM, RAM, and timers. In response to various commands corresponding to key operations supplied from the operation part 18, the system controller 7 executes arithmetic operations on the basis of data or programs stored in ROM, RAM and the like, and subsequently supplies instruction signals for the play, search, jump operation or the like, to the playing part control circuit 5.

Figure 4:
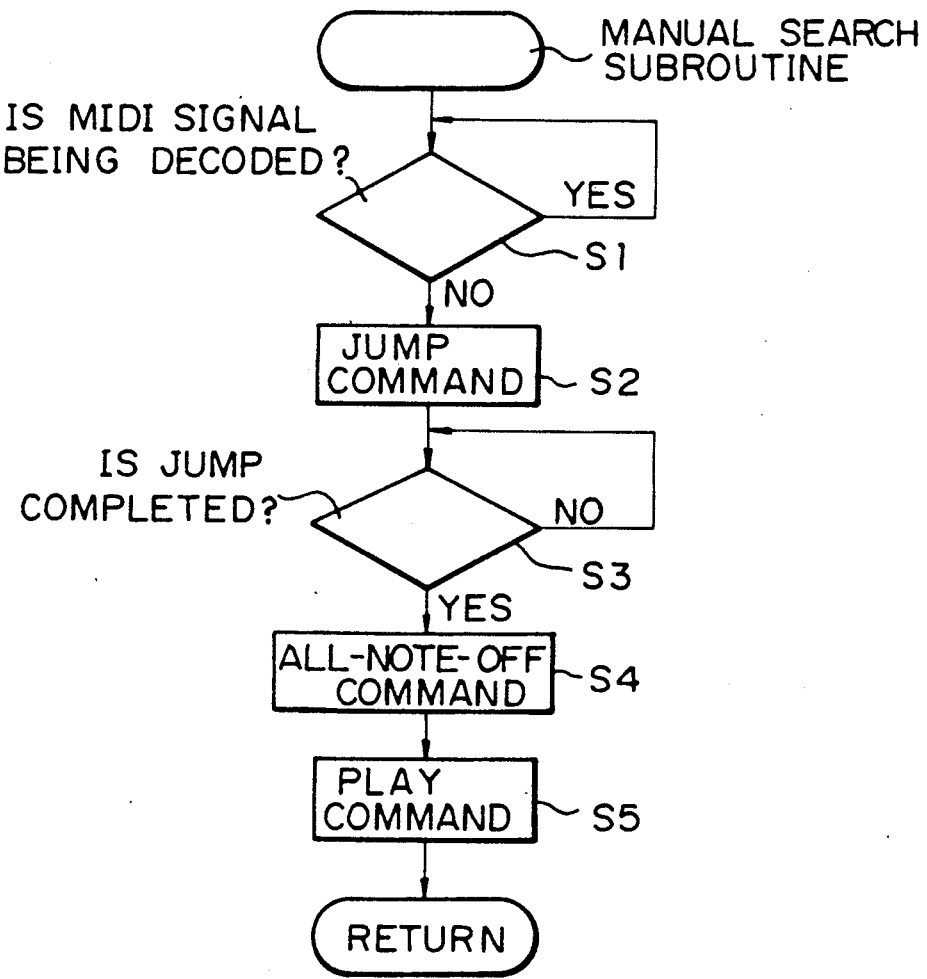
FIG. 4 is a flowchart showing the control operation of the system controller 7.

The operation of the processor of the system controller 7 in the apparatus having the construction mentioned above will be explained with reference to the flowchart of FIG. 4.

If the manual search command is issued when the operational mode of the player is set to the play mode by the execution of the play mode control routine and the like, the processor proceeds to step S1 in which the processor judges whether or not the transmission signal is supplied from the MIDI decoder 22 (step S1). When the transmission signal is being generated, it means that the decoding of the MIDI signal is taking place, and the processor inhibits the track jump operation for a certain period in order to prevent the generation of errors in the decoding of data. When it is judged in step S1 that the transmission signal is not supplied, the processor issues a jump command to the play control part 5 (step S2). When the processor detects the completion of the track jump operation (step S3) by the detection of the locking of the tracking servo system (not shown) or the supply of the control code from the subcode error correction circuit 20, the processor supplies to an "all-note-off" command to the MIDI decoder 22, so as to cause the MIDI decoder 22 to transmit the "all-note-off" message to all MIDI channels (step S4). In response to this command, the MIDI decoder 22 transmits the "all-note-off" message to all MIDI channels. With this operation the MIDI apparatuses, which have been put in an unstable state by the omission of the MIDI signal during the manual search operation, are initialized.

Then, the processor issues a play command to the play control part 5, to restart the playing operation (step S5). After that, the processor returns to the execution of the main routine. If the manual search command is being issued continuously, the processor repeats the operation of the steps S1 through S5, so as to alternate the track jump operation and the playing state.

As explained in the foregoing, the player is configured to execute the track jump operation after the completion of the transmission of the MIDI message, in other words the completion of the decoding operation, and to supply the "note-off" message forcibly to the MIDI apparatuses after the completion of the track jump operation. Therefore, the decoding error of the MIDI data is reduced, and the possibility of the inconvenience, that the generation of sound from the sound source cannot be stopped, is also reduced.

In addition, the musical instrument playing program to be supplied to MIDI apparatuses is read out in an order different from the order in which the program is written on the disc also in the state of the address search, pause, or stop beside the state of manual search. Therefore, the inconvenience that the generation of sound from the sound source cannot be stopped, may occur in any one of such states.

It is to be noted that the inconvenience in such a case can also be reduced by the application of the present invention.

Furthermore, in the preferred embodiment, the "all-note-off" message is issued after the completion of the track jump operation. However, the same result can be obtained by issuing this message before the issuing of the jump command in step S2.

In addition, a command which stops the generation of sound from the MIDI apparatus as the "all-note-off" message, such as the "note-off" message for each MIDI channel or an initializing message such as the "system reset" message, can be used instead of the "all-note-off" message.

The application of the present invention is not limited to disc players, and the present invention can be applied in the control of a tape deck for playing a magnetic tape on which musical instrument playing programs are recorded, during an operational state such as the search, pause, or stop operation.

As explained in the foregoing, the information recording medium playing apparatus according to the present invention is configured that the sound generation stop command is supplied to electronic musical instrument when the information recording medium on which the musical instrument play control signal of musical instruments are recorded is played in an order of reading different from the order of writing. Therefore, the occurrence of the inconvenience that the generation of sound cannot be stopped, is effectively prevented.

What is claimed is:

1. A recording medium playing apparatus comprising:
   means for reading, from an information recording medium main program signals and sub-program signals, carrying musical instrument play control signals in a reading order normally identical with an order of writing of said main program and sub-program signals;
   musical instrument play control signal decoding means for decoding a musical instrument play control signal from said sub-program signals and for supplying said musical instrument play control signals to electronic musical instruments; and
   control means for controlling operation of said reading means in response to an operational command, said control means having means for commanding said musical instrument play control signal decoding means to transmit a sound generation stop command signal when said operational command is to command said reading means to perform a reading operation which order is different in order from said order of writing.

2. An apparatus as claimed in claim 1, wherein said control means has means for executing said operational command after completion of a decoding operation by said musical instrument play control signal decoding means when said operational command is to command said reading means to perform a reading operation which is different in order from said order of writing.

3. An apparatus as claimed in claim 1, wherein said information recording medium is an information recording disc, and said operational command is a command for at least one of pause, still picture reproduction, search, track jump, and play stop operation.

4. An apparatus as claimed in claim 1 wherein said information recording medium is a magnetic tape, and said operational command is a command for at least one of fast-forward, rewind, pause, and play stop operation.

5. An apparatus as claimed in claim 1 wherein said sound generation stop command signal is one of note-off message, all-note-off message, and initializing message.

6. An apparatus as claimed ian claim 2, wherein said information recording medium is an information recording disc, and said operation command is a command for at least one of pause, still picture reproduction, search, track jump, and play stop operation.

7. An apparatus as claimed in claim 2, wherein said information recording medium is a magnetic tape, and said operational command is a command for at least one of fast-forward, rewind, pause, and play stop operation.

8. An apparatus as claimed in claim 2, wherein said sound generation stop command signal is one of note-off message, all-note-off message, and initializing message.

* * * * *

UNITED STATES PATENT AND TRADEMARK OFFICE
CERTIFICATE OF CORRECTION

PATENT NO. : 5,038,660
DATED : August 13, 1991
INVENTOR(S) : Osamu WATANABE It is certified that error appears in the above-identified patent and that said Letters Patent is hereby corrected as shown below:

On title page, item [30], insert

Foreign Application Priority Data

January 31, 1989 [JP]  Japan .............1-23125--

Signed and Sealed this

Thirtieth Day of March, 1993

*Attest:*

STEPHEN G. KUNIN

*Attesting Officer*      *Acting Commissioner of Patents and Trademarks*